(12) United States Patent
Plutowski et al.

(10) Patent No.: US 8,050,935 B2
(45) Date of Patent: Nov. 1, 2011

(54) DYNAMIC WEB SERVICE COMPOSITION TO SERVICE A USER REQUEST

(75) Inventors: Mark Earl Plutowski, San Jose, CA (US); Khemdut Purang, San Jose, CA (US); Vivek Chopra, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1979 days.

(21) Appl. No.: 10/816,533

(22) Filed: Mar. 31, 2004

(65) Prior Publication Data

US 2005/0096960 A1      May 5, 2005

Related U.S. Application Data

(60) Provisional application No. 60/516,772, filed on Nov. 3, 2003.

(51) Int. Cl.
*G06Q 10/00* (2006.01)
(52) U.S. Cl. .......................................................... 705/1.1
(58) Field of Classification Search ................ 705/1, 1.1
See application file for complete search history.

(56) References Cited

U.S. PATENT DOCUMENTS

| | | | | |
|---|---|---|---|---|
| 7,068,189 B2 * | 6/2006 | Brescia | ...................... | 340/995.1 |
| 7,266,376 B2 * | 9/2007 | Nakagawa | .................. | 455/456.1 |
| 2003/0046119 A1 * | 3/2003 | Yamamoto | ........................ | 705/5 |

OTHER PUBLICATIONS

Frank Sommers, A birds-eye view of Web services, Jan. 25, 2002, JavaWorld.com.*
Business Process Modeling Languagem Nov. 13, 2002, BPMI.org.*
BPML, Jun. 10, 2002, ebPML.org, © 2001, Last Updated, Feb. 25, 2002. printed through www.archive.org. Date is in the URL in YYYYMMDD format.*
Ankolekar, A., et al., "DAML-S: Semantic Markup For Web Services," The DAML Services Coalition, Proceedings of the International Semantic Web Workshop, 2001, 20 pages.

* cited by examiner

*Primary Examiner* — Naresh Vig
(74) *Attorney, Agent, or Firm* — Blakely, Sokoloff, Taylor & Zafman LLP

(57) ABSTRACT

A method and apparatus for dynamic Web Service composition is described. A user request is received. Multiple Web Services that may need to be performed according to the user request are identified. A Web Service composition is generated from the multiple Web Services. The Web Service composition is expressed in a business process modeling language that incorporates exception handling.

25 Claims, 9 Drawing Sheets

DYNAMIC WEB SERVICE COMPOSITION TO SERVICE A USER REQUEST

RELATED APPLICATIONS

The present application claims priority to U.S. Provisional Application Ser. No. 60/516,772, filed Nov. 3, 2003, which is incorporated herein in its entirety.

FIELD OF THE INVENTION

The present invention relates to Web Services, and more particularly to dynamic composition of Web Services.

BACKGROUND

The web offers a variety of services that can be accessed by an individual using a web browser. Web Services may be information services (e.g., routing services that provide driving directions, yellow-page services that provide information about places of interest, movie-time services for movie listings, etc.) or action facilitating services (e.g., Web Services enabling specific actions such as buying books, booking flights and hotels, operating webcams, etc.). In addition, Web Services may provide networked access to electronic devices (e.g., online weather services providing the wind speed and temperature to a weather station) or be provided by electronic devices (e.g., a GPS device providing the service of specifying its location, a mobile phone providing a communication service, a PDA providing an interface service, etc.).

Web Service composition is the task of composing sets of Web Services to achieve more complex goals. For example, planning a vacation may require coordinating flights, hotels, rental cars, places of interest to visit, etc. A user can plan a vacation by visiting various travel web sites and coordinating the choices manually, but that is a complex and tedious task. In addition, such a manual solution may not allow a user to find an optimal match because of a large number of possible combinations of choices. In another example, tourists may need on-going information about the attractions of interest in their vicinity as they are traveling. Such information cannot be provided by a single device. Instead, it involves multiple services from multiple devices, including, for example, the GPS, a communication service by a user cellular phone, an interface service by a user PDA, and a yellow-pages service. Furthermore, none of these devices are themselves essential because the services they provide may be available through some other devices. For example, a camcorder can be substituted for the PDA to display information to the tourist, an Internet connection on a PDA can be substituted for the cellular phone, etc. This gives great flexibility in mixing and matching devices that can be configured to provide complex services, as they are needed.

SUMMARY OF THE INVENTION

A method and apparatus for dynamic Web Service composition is described. A user request is received. Multiple Web Services that may need to be performed according to the user request are identified. A Web Service composition is generated from the multiple Web Services. The Web Service composition is expressed in a business process modeling language that incorporates exception handling.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
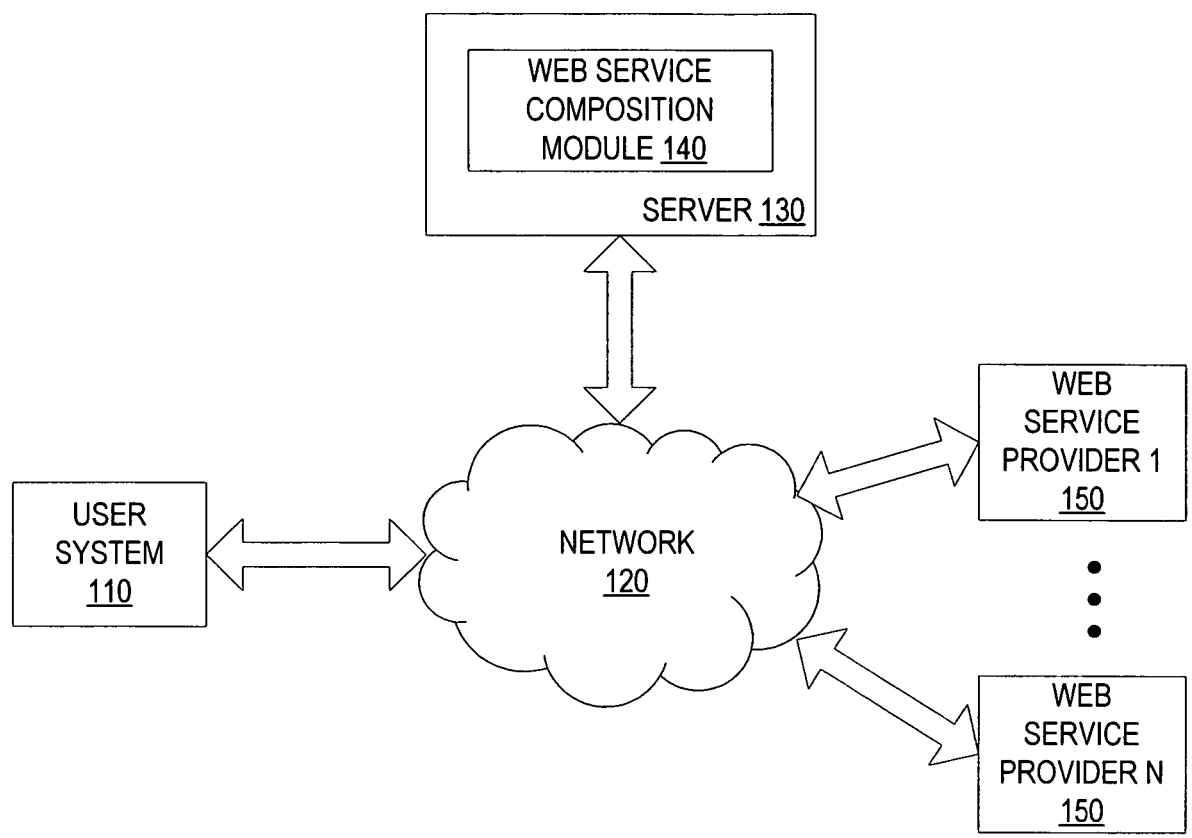
FIG. 1 is a block diagram of one embodiment of a network on which embodiments of the present invention may operate.

FIG. 1 illustrates one embodiment of a network on which embodiments of the present invention may operate. The user system 110 may include a computer system, an in-car navigation system, a mobile phone, a palm top, one or more special purpose appliances, or any other devices or combinations of devices configured to provide Web Services to the user.

The user system 110 is coupled via a network 120 to a server 130. The connection between the user system 110 and the network 120 may be via any method, including direct connection, DSL, wireless, Bluetooth, the telephone network, or any other method of connectivity.

The server 130 may be accessible to the user system 110 through a public network (e.g., the Internet), a Local Area Network, a Wide Area Network, a Virtual Private Network, or any other system.

The server 130 includes a Web Service composition module 140. The Web Service composition module 140 is responsible for receiving user requests for service from the user system 110, identifying a collection of Web Services that may be need to be performed according to the user request, and dynamically (i.e., in real time) generating a composite Web Service from the identified Web Services. The identified Web Services may be provided by devices within the user system 110, external devices, Web Service providers 150 (e.g., via corresponding web sites), or any combination of the above. The composite Web Service generated by the Web Service composition module 1440 is expressed in BPEL (also known as BPEL4WS (Business Process Execution Language for Web Services)) or any other business process modeling language that incorporates exception handling (e.g., BPML (Business Process Modeling Language), WSCI (Web Service Choreography Interface)). As will be discussed in more detail below, in one embodiment, the Web Service composition module 140 uses Artificial Intelligence (AI) planning to generate a plan for the user request, and then translates this plan into a composed Web Service expressed in BPEL (referred to herein as a BPEL process composition). It should be noted that although embodiments of the present invention are described with reference to BPEL, any other business process modeling language that incorporates exception handling can be used with the embodiments of the present invention without loss of generality.

The BPEL process composition specifies the execution order of operations from the collection of Web Services, the data shared between these Web Services, which Web Service providers 150 are involved and how they are involved in the composite Web Service, joint exception handling for the collection of Web Services, and various other information.

Figure 2:
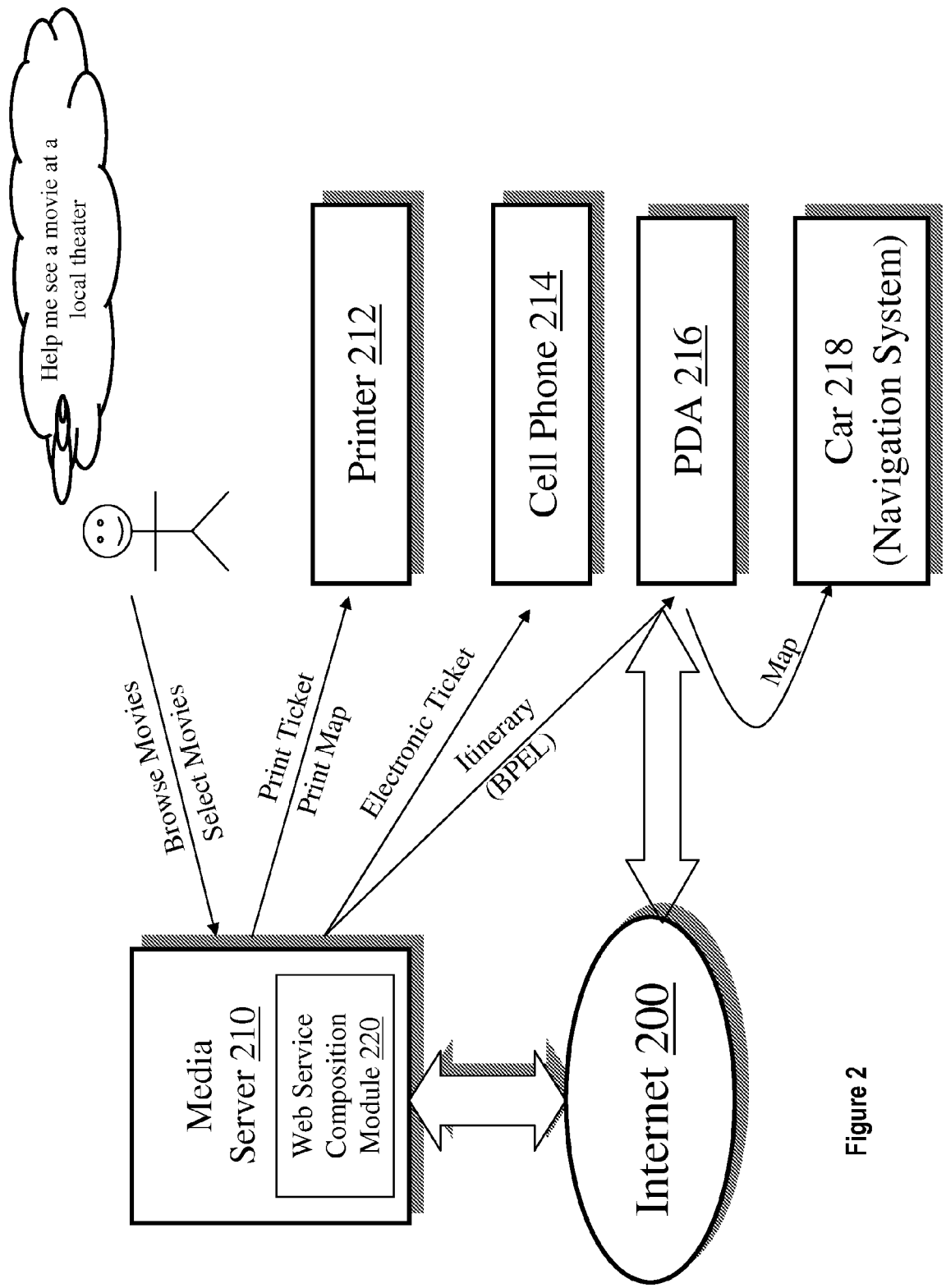
FIG. 2 illustrates an exemplary application of one embodiment of the present invention.

FIG. 2 illustrates an exemplary application of one embodiment of the present invention.

Referring to FIG. 2, a user system (e.g., the user system 110 of FIG. 1) includes a computer system with a printer 212, a mobile phone 214, a personal digital assistant (PDA) 216, and an in-car navigation system 218.

The user system is coupled to a media server 210 via a public network (e.g., the Internet) 200. The media server 210 stores multimedia data including, for example, data pertaining to movies (e.g., movie listings, trailers, clips, movie reviews, theater repertoires, etc.). A Web Service composition module 220 resides on the media server 210 and is responsible for receiving various user requests and composing Web Services according to the user requests.

In the example illustrated in FIG. 2, a user browses a list of movies provided by the media server 210, selects a movie from the list, and requests assistance in seeing this movie at a local theater. In response, the Web Service composition module 220 identifies services needed for the user request and devices that are capable of providing those services, generates a BPEL process composition (illustrated as a BPEL itinerary) based on the identified services, and downloads the BPEL process composition to the PDA 216 for execution. The BPEL process composition includes a map, driving directions to the theater, parking information, a confirmation number of the electronic ticket, a theater phone number, show times, and contingencies information (e.g., location of a different parking garage if the closest parking garage is full, etc.). In addition, the Web Service composition module 220 sends instructions to the computer system to print the electronic ticket and the map on the printer 212 and downloads an electronic ticket to the mobile phone 214.

When the plan executes on the PDA 216, it causes the PDA to download the map to the in-car navigation system 218 to subsequently provide directions to the user. The PDA 216 also stores the itinerary information locally to subsequently display it to the user.

Figure 3:
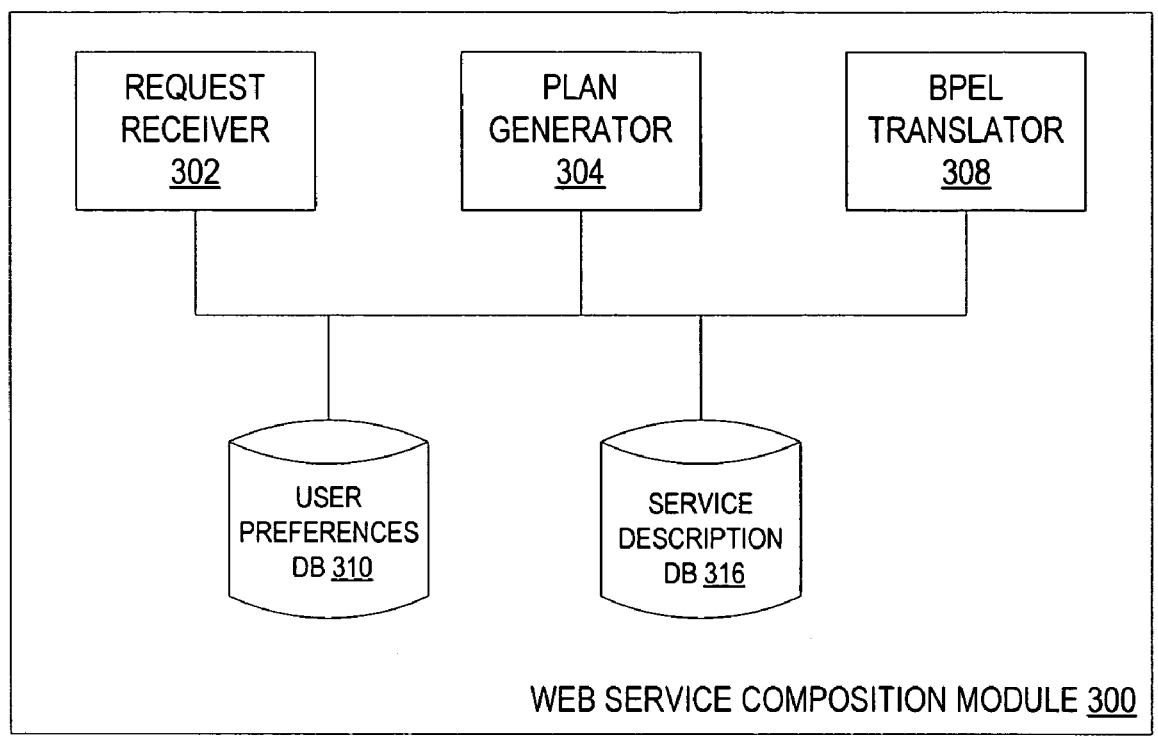
FIG. 3 is a block diagram of one embodiment of a Web Service composition module.

FIG. 3 is a block diagram of one embodiment of a Web Service composition module 300. The Web Service composition module 300 includes a request receiver 302, a plan generator 304, a BPEL translator 308, a user preference database 310, and a service description database 316.

The request receiver 302 is responsible for receiving a user request for service and determining requirements associated with the user request. The requirements are determined based on user preferences (and, when applicable, constraints associated with user devices) that may either be identified in the user request or known in advance based on data stored in the user preference database 310 or provided by the user system.

The plan generator 304 is responsible for identifying Web Services needed to satisfy the requirements associated with the user request and generating a service plan for performing the identified Web Services. The Web Services are identified using data stored in the service description database 316. The service plan may be generated using various methods, as will be described in more detail below.

The BPEL translator 308 is responsible for translating the plan into a BPEL process composition. As will be discussed in greater detail below, the translation is performed by adding more information to the plan and changing the syntax of the plan to the BPEL syntax.

FIGS. 4-7 are flow diagrams of Web Service composition processes that may be performed by a Web Service composition module 300 of FIG. 3, according to various embodiments of the present invention. The process may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 4-7 without departing from the scope of the invention and that no particular order is implied by the arrangement of blocks shown and described herein.

Figure 4:
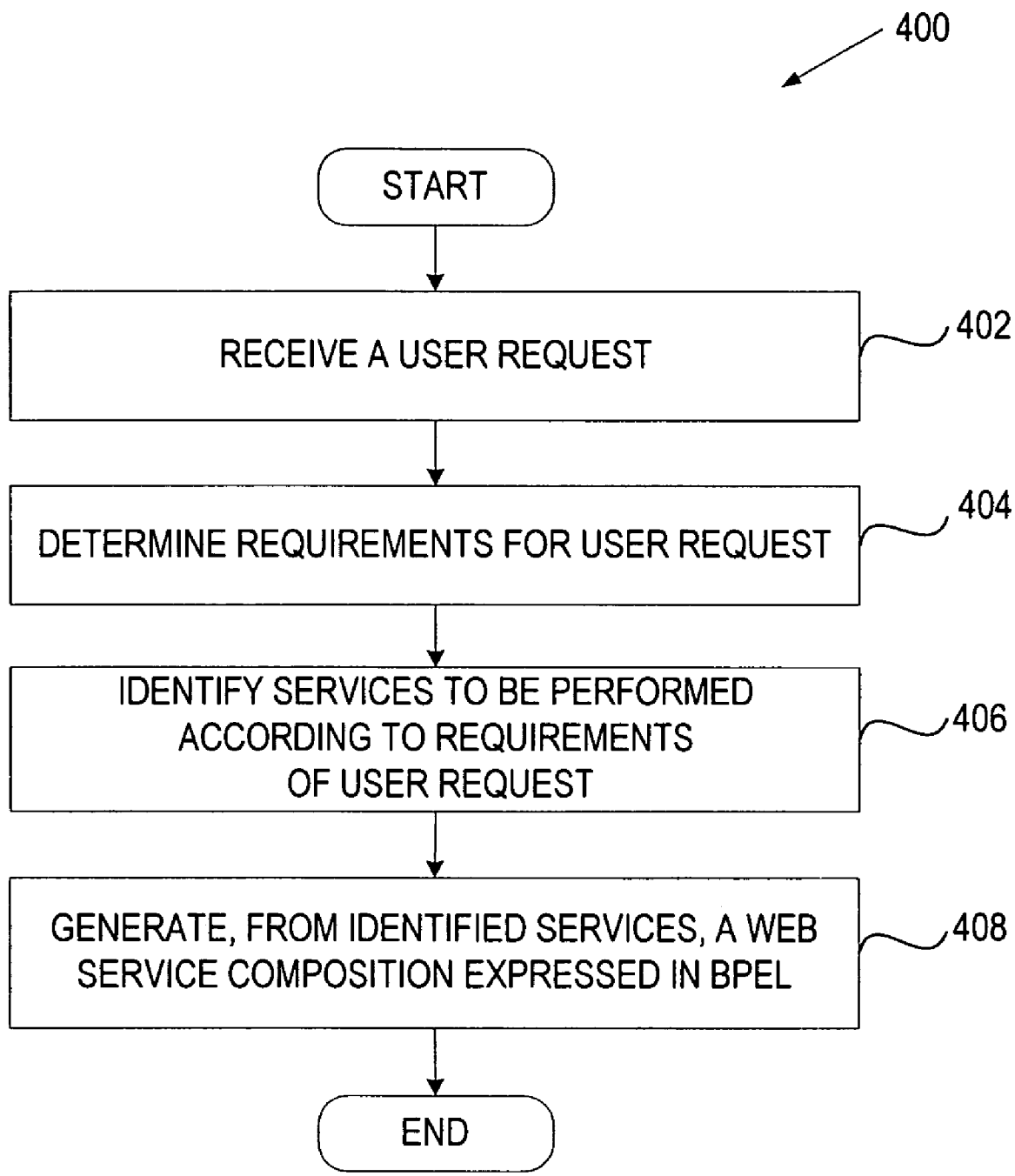
FIGS. 4-7 are flow diagrams of Web Service composition processes in accordance with various embodiments of the present invention.

FIG. 4 is a flow diagram of one embodiment of a Web Service composition process 400.

Referring to FIG. 4, processing logic begins with receiving a user request (processing block 402) and determining requirements associated with the user request (processing block 404). The requirements may be determined based on information specified in the request (e.g., information specified by the user), user profile information (e.g., user preferences and characteristics of user devices from a user preference database 310 maintained by the Web Service composition module 300 and/or from a database maintained by the user system), and information associated with previous requests of this or other users.

At processing block 406, processing logic identifies Web Services to be performed, in order to satisfy the requirements of the user request. In one embodiment, the Web Services are identified by de-composing, using an automated planner, a problem posed by the user request into sub-problems for which known solutions can be used, and then mapping the sub-problems to relevant Web Services based on service descriptors (e.g., stored in the service description database 316).

At processing block 408, processing logic generates, from the identified Web Services, a Web Service composition expressed in BPEL. In one embodiment, the Web Service composition is generated by creating a service plan for the identified services and translating the service plan into a BPEL process composition. The resulting BPEL process composition is then executed in a BPEL execution engine that may reside on a user system (e.g., the user system 110), a server (e.g., the server 120) or any other computer system having network connection.

Various embodiments of a process for generating a composite Web Service expressed in BPEL will now be described in more detail.

As discussed above, BPEL (also known as BPEL4WS) is a language for expressing composite Web Services. Some advantageous features of BPEL include, for example, direct support for exception handling and availability of a BPEL execution engine. However, as compared to another language for expressing composite web site services that is known as DAML-S (Defense Advanced Research Project Agency (DARPA) Agent Markup Language for Services), BPEL does not support ontologies (an ontology is a specification of a conceptualization, or in other words, an ontology is a description of the concepts and relationships that can exist for an agent or a community of agents). Thus, terminology and semantics have to be predefined and known in advance by service providers using the embodiments of the present invention.

Some embodiments of the present invention generate Web Service compositions based on planning and treat Web Services as actions that have effects on the world. In particular, a wide variety of automated planning techniques may be used to compose a set of actions into a plan that achieves a goal posed by the user request, given a desired goal, a domain model, and a set of actions. These techniques take into account the conditions that must be true before an action is executed (preconditions of the action) and the conditions that are true after the action is executed (effects) and ensure that executing the composition of the actions will result in the goal being true.

Planning may require that the problem to be solved be expressed in terms of a planning domain and a planning problem. Planning domains specify fluents (i.e., predicates that change) and actions. Planning problems specify the initial state of the world and the goal in terms of the fluents. The actions are specified through the effects of the fluents on the execution of the actions and vice-versa. The preconditions of an action represent the states of the world in which the action can be successfully executed. The effects of an action represent the changes to the fluents that result from executing the action. In the case of Web Services, the fluents represent facts about the physical world as well as about the world of services. For example, preconditions for a service for buying a book may require that the input represent a valid book, that that book be available, that the input represent a valid credit card, and that the card be not overdrawn. The effects are that the book is shipped to the user, the user is charged the appropriate amount and a receipt is returned. Some of these fluents are about the world (book validity), and some are about the properties of the Web Service usage (valid input). A planner, given a domain and problem, generates a plan, which represents a sequence of actions. In the case of Web Service composition, the sequence of actions include invocations of Web Services. If the actions are executed in order from the initial state, the goal state is guaranteed to be reached, provided an accurate model of the domain is used. In some embodiments, in which the model is not completely known beforehand, planners capable of generating contingent plans are used to allow information obtained during execution of the plan to influence the choice of actions. In other embodiments, planners capable of generating concurrent plans are used to allow several actions to be executed concurrently. In some embodiments, a planner generates only a subset of possible BPEL compositions (e.g., like sequences, switch statements, loops, non-deterministic choices, etc.), limiting the resulting BPEL process compositions accordingly.

BPEL compositions consist of Web Service invocations and actions internal to the BPEL execution engine that are necessary for successful invocations (e.g., variable assignments). In some embodiments, BPEL compositions also include details of the Web Services (e.g., the port type and the namespace). These details can be added to a plan after it is derived.

In one embodiment, for a Web Service to be invoked correctly, the variables corresponding to its input parameters have to be set to the appropriate values. These values may depend on the previous actions as well as on the particular service to be invoked. These assignments are not fixed and may be specified by the planner during the derivation of the plan. To do so, the planner domain needs to include a partial description of the execution of the BPEL process. Hence, the domain description for the planner needs to contain at least a partial model of the execution of a BPEL process. However, such a model is not available.

One embodiment of the present invention addresses this problem by partially modeling BPEL processes, using a relevant partial model with descriptions of services to generate a plan, and then translating the plan to a BPEL composite process. This embodiment will now be discussed in more detail with reference to FIG. 5.

Figure 5:
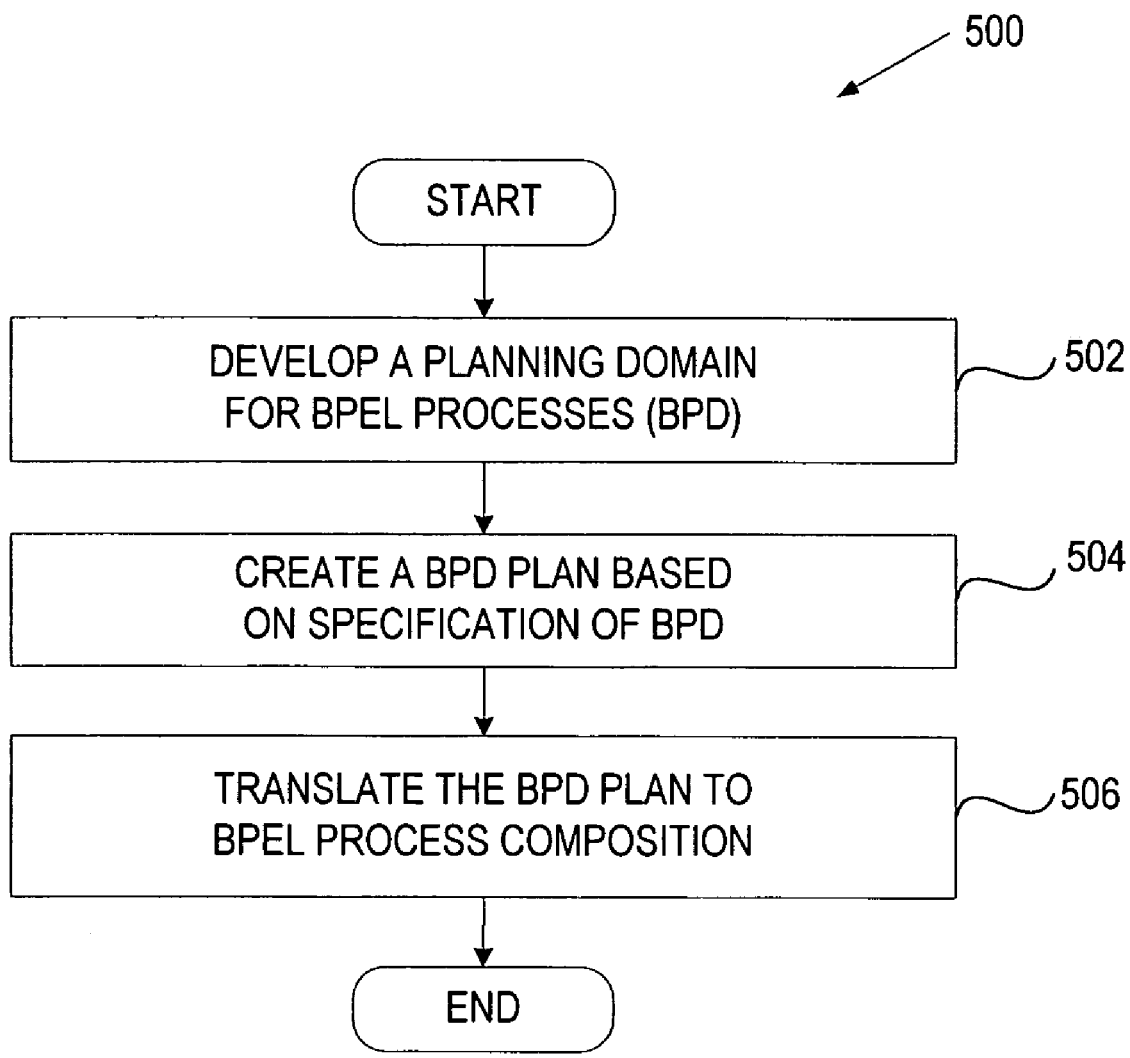

Referring to FIG. 5, processing logic of process 500 begins with developing a planning domain for BPEL processes (processing block 502). This domain (referred to herein as a BPD) models the world, relevant information and the sate of the BPEL process to enable composition of information producing services and world altering services. In one embodiment, development of the planning domain includes specifying classes of BPD objects, fluents characterizing BPD objects, and BPEL process actions modeled by BPD, and specifying a problem for the BPD. In one embodiment, the BPD is represented in a Planning Domain Definition Language (PDDL). In one embodiment, the BPD is developed based on input provided by a domain expert. Alternatively, the BPD is developed automatically using description of services in DAML-S, PDDL, WSDL or any other description language.

In one embodiment, the BPD includes three classes of objects: world objects, information objects and BPEL variable objects. World objects include physical objects (e.g., tourist attractions) and virtual objects (e.g., e-tickets). Information objects represent unanalyzed pieces of information. In one embodiment, the information type is sub-typed according to the kind of information represented (e.g., yellow-page information is represented as an object of type yp-info). Information-providing services may be modeled as asserting properties of existing information objects (instead of creating them). BPEL variable objects correspond to each message/part combination identified in the specification of services (e.g., the specification of services in WSDL (Web Services Description Language)). For example, "ypin" represents the first part of the input message to the yellow-pages service. BPEL variable objects may refer to non-variable objects.

In one embodiment, fluents characterizing BPD objects include fluents associated with world objects, fluents associated with BPEL variable objects and fluents associated with information objects. For example, "at" is a world object fluent that gives the location of an agent, "(knows X Y)" is an information object fluent that represents knowledge of agent X about information object Y, and "refers-to " fluent is a BPEL variable object fluent that represents association between BPEL variables and objects.

In one embodiment, modeled BPEL process actions include copy and invocation actions. Copy actions change the reference of BPEL variables. Copy actions undo the old reference and assert the new reference and may be between variables and between literal values and variables. An exemplary copy action may expressed as follows:

```
(:action copy-var
    :parameters (?x - variable ?y - variable
                 ?ox - object ?oy - object)
    :precondition (and (refers-to ?x ?ox)
                       (refers-to ?y ?oy))
    :effect (and (refers-to ?y ?ox)
                 (not (refers-to ?y ?oy))))
```

Operation of a service is represented by an invocation action. The effects can include assignment to a BPEL variable, or an effect in the world. The effect of invoking the yellow-pages service, for example, is to assert that the output variable has the yellow-pages information about the location that was referred to in the input variable. An exemplary invoking action that affects BPEL variables may be expressed as follows:

```
(:action invoke-yp
    :parameters (?in - ypin ?out - ypout
                 ?loc - location ?y - yp-info
                 ?i - information)
    :precondition (and (refers-to ?in ?loc)
                       (is-ypinfo ?loc ?y)
                       (refers-to ?out ?i))
    :effect (and (refers-to ?out ?y)
                 (not (refers-to ?out ?i))))
```

Another exemplary invoking action that affects the world (e.g., the effect of the display service provided by a hand-held device is that the user knows the information displayed) may be expressed as follows:

```
(:action invoke-display
    :parameters (?in - dsin ?out - dsout
                 ?i - information ?a - agent)
    :precondition (refers-to ?in ?i)
    :effect (knows ?a ?i))
```

In one embodiment, the problem specification specifies BPEL variable objects that will be used in the plan for each class of problems to be solved, and the goal for the plan. In one embodiment, the BPEL variable objects are specified by the domain expert for each class of problems to be solved. The goal for the plan may involve information objects. For example, the goal that the user visit the Metreon and return to the hotel may be expressed as "(and (visited user metreon) (at user hotel))".

Still referring to FIG. 5, at processing block 504, a plan is created based on the specification of the BPD. The plan is created for the goal specified in the BPD using a PDDL planner (a planner whose inputs are specified in PDDL) or any other automated planner. An exemplary plan obtained from a Metric-FastForward (FF) planning system (which is a specific PDDL planner) for the goal of visiting the Metreon and returning to the hotel can be expressed as follows:

```
(COPY-EXP HOTEL MPIN1-VAR1 NULL)
(COPY-EXP METREON MPIN2-VAR1 NULL)
(COPY-VAR MPIN2-VAR1 YPIN-VAR2 METREON...)
(INVOKE-MAPPER MPIN1-VAR1 MPIN2-VAR1 ...)
(INVOKE-YP YPIN-VAR2 YPOUT-VAR2 ...)
(COPY-VAR MPOUT-VAR1 DSIN-VAR3 ...)
(INVOKE-DISPLAY1 DSIN-VAR3 DSOUT-VAR2 ...)
(COPY-VAR MPIN2-VAR1 MPIN1-VAR1 ...)
(COPY-EXP HOTEL MPIN2-VAR1 ...)
(INVOKE-MAPPER MPIN1-VAR1 MPIN2-VAR1 ...)
(COPY-VAR YPOUT-VAR2 DSIN-VAR3 ...)
(INVOKE-DISPLAY2 DSIN-VAR3 DSOUT-VAR2 ...)
(COPY-VAR MPOUT-VAR1 DSIN-VAR3 ...)
(INVOKE-DISPLAY1 DSIN-VAR3 DSOUT-VAR2 ...)
```

According to the plan, the goal of visiting the Metreon and returning to the hotel can be achieved by providing the user with a map to get to the Metreon, yellow-page information for the Metreon, and a map to get back. Each of these pieces of information is obtained by an invocation of a corresponding service and displayed to the user. The input variables of the service are assigned by copy actions prior to the invocations. An assumption is that the user will go to the Metreon when provided with the map.

At processing block 506, processing logic translates the BPD plan to a BPEL process composition. The BPD plan is a high-level view of the BPEL process that is required to achieve the goal. The translation of the BPD plan to a BPEL process composition involves adding relevant information to the plan and modifying the syntax of the plan. In one embodiment, the translation to BPEL includes adding static information to a static part of the BPEL process composition and dynamic information to a dynamic part of the BPEL process composition. Static information may include, for example, the namespace declarations, the variable declarations and the set of partners of the composition (providers of Web Services). The static information is fixed once the services to be used and the class of tasks are decided. In one embodiment, the static information can be reused for subsequent compositions.

Dynamic information pertains to BPEL operations to be executed and includes details on copy and invocation actions including, for example, the operation name, the partner and the port type. In one embodiment, the static and/or domain information is specified by the domain expert for each action in the domain. Alternatively, the static and/or domain information is generated automatically using service description information stored in a database. A segment of an exemplary BPEL process composition involving invocation of the yellow-pages service for the Metreon and subsequent display of information to the tourist can be expressed as follows:

```
<assign name="assign12677">
    <copy>
        <from expression="'METREON'"/>
        <to variable="ypinput" part="in0"/>
    </copy>
</assign>
<invoke name="invocation12678" partner="yp"
        portType="ypns:DBLookupService"
        operation="guideBook"
        inputVariable="ypinput"
        outputVariable="ypoutput"/>
<assign name="assign12679">
    <copy>
        <from variable="ypoutput"
              part="guideBookReturn"/>
        <to variable="dsinput" part="in1"/>
    </copy>
</assign>
```

-continued

```
<invoke name="invocation12681" partner="ds"
        portType="dsns:DisplayService"
        operation="display"
        inputVariable="dsinput"
        outputVariable="dsoutput"/>
```

Because process 500 relies on BPEL variables, it may result in a large search space, which is not desirable for fast composition. In addition, the number of copy instances may increase with an increase in the number of variables. Further, for each service, variables are copied to its input variables, and the service is invoked. These actions are generated by the planning process and involve search, making the planning less efficient. Also, the planner in process 500 interleaves actions that intuitively belong together. While this does not affect the plan, it makes the plan harder to understand and debug if needed.

Figure 6:
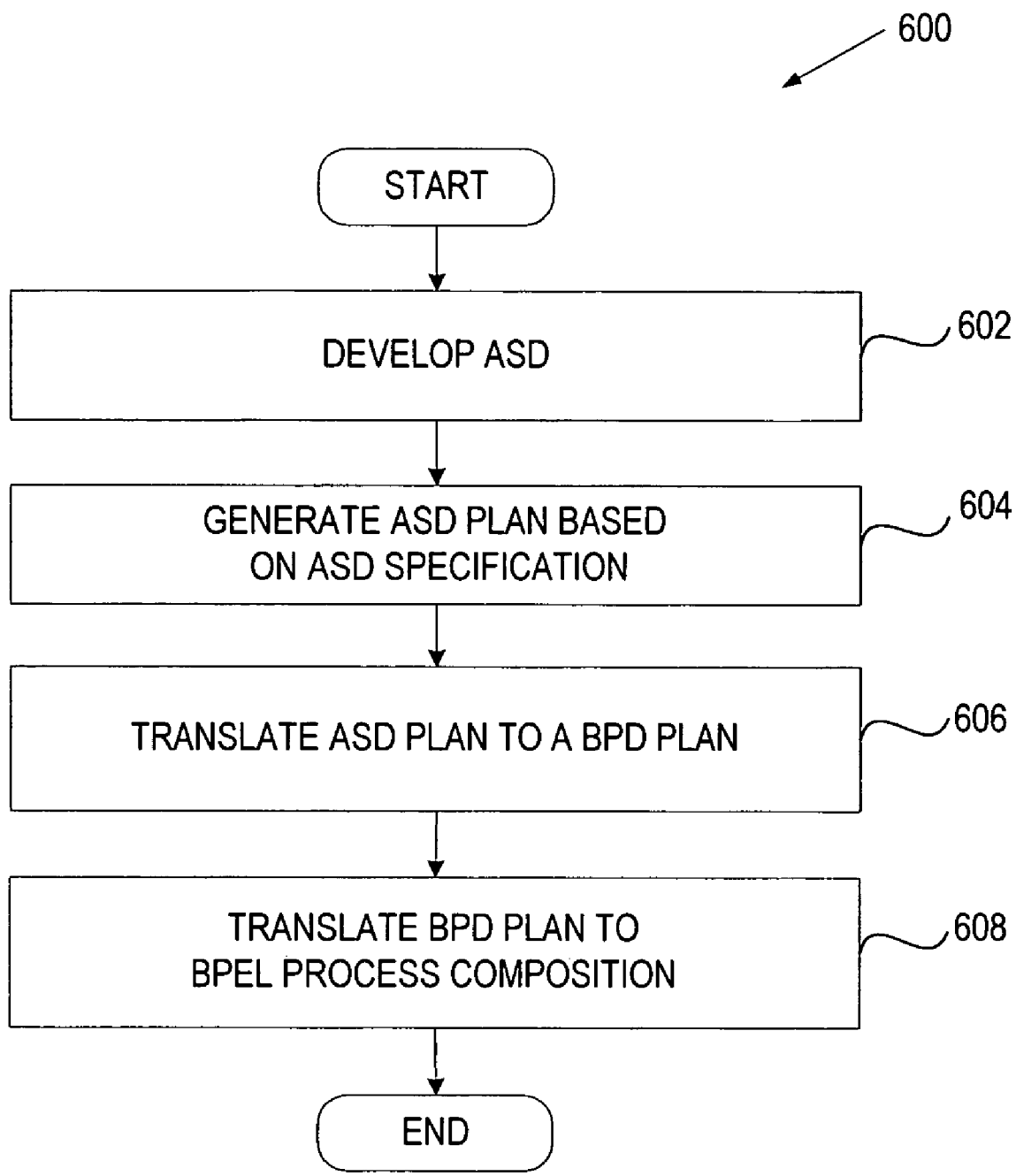
Figure 7:
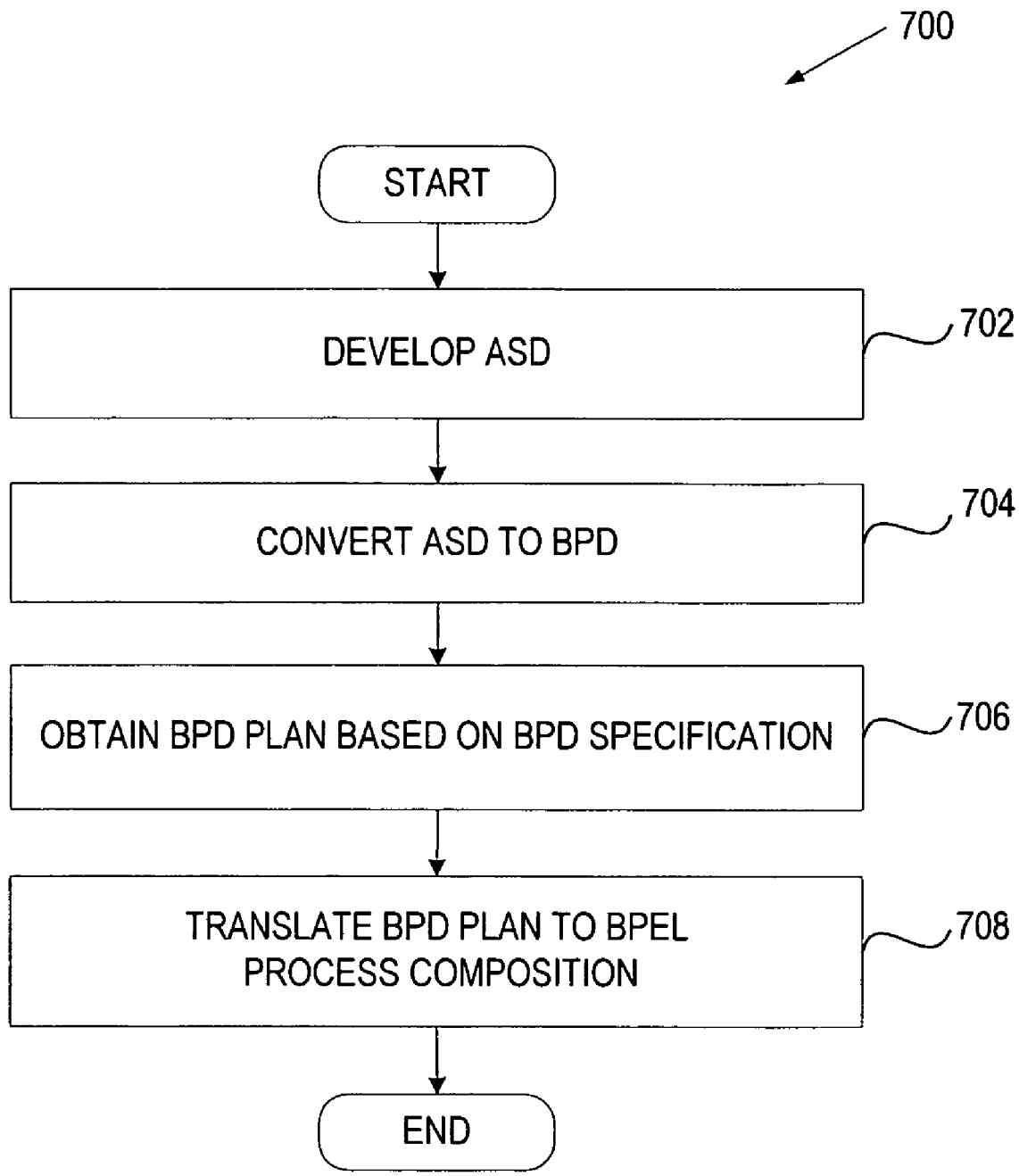

Some embodiments of the present invention overcome the limitations of process 500 by abstracting the Web Services and internal BPEL operations into an abstract service domain. FIGS. 6 and 7 are flow diagrams of two embodiments of a process for composing Web Services using an abstract service domain.

Referring to FIG. 6, processing logic of process 600 begins with developing an abstract service domain (ASD) (processing block 602). The ASD is based on the BPEL planning domain (BPD) and gives a higher-level view of the services appropriate for solving problems in some classes. The ASD may be created once and need not be recreated for each composition. That is, the ASD can be reused for all composite Web Services subsumed by the process model.

The ASD ignores some aspects of the BPD. Specifically, the ASD removes BPEL variables and copy actions from its specification. This has several advantages: (1) it is possible for someone with no knowledge of the details of the BPEL process to describe a planning domain, (2) it separates the subject matter of the planning from the execution, (3) it reduces the size of the domain and of the resulting plans which leads to faster computations, (4) it makes it easier to debug the problem domain description, and (5) it makes it possible for the same set of services to be easily reused with different problem domains.

However, it is essential that the internal operations be performed accurately for the process composition to be successfully executed. Embodiments of the present invention solve this problem by introducing a set of abstract services that encapsulate the assignment of the input variables and the invocations of the Web Services. These abstract services can also involve the invocation of several Web Services with variable copying between their input and output messages. Constraints on the abstract services are specified so that plans in the ASD can be refined to BPD plans by translation. In one embodiment, the abstract services are defined by a domain expert for a particular class of problems. In another embodiment, the abstract services are defined automatically based on examples of non-abstract services.

In one embodiment, the abstract services are chosen as a sequence of BPD actions appropriate for the class of problems of interest. The same set of Web Services can give rise to different sets of abstract services depending on the kind of goals of interest. The preconditions and effects of abstract services are described in terms of corresponding BPD actions and conditions to enable translation of plans of abstract services to plans of BPD actions.

Beginning with defining terms, consider a sequence of BPD actions $s=\langle a_1, \ldots, a_n \rangle$. For each action $a_i$, let the precondition be $p_i = \phi^i_1 \wedge \ldots \wedge \phi^i_m$ and the effect be $e_i = \Psi^i_1 \wedge \ldots \wedge \Psi^i_l$. Then, the following statements are true:

1. For each j, $0 \leq j \leq n$, $P_j$ and $E_j$ are as follows:
   (a) $P_0 = E_0 = \emptyset$
   (b) $P_{i-1} \subset P_i$ and for each $\phi^i k$ that is a conjunct of $p_i$, if $\phi^i k \in \overline{E_{i-1}}$ then $\phi^i k \in P_i$.
   (c) For each $\psi^i k$ that is a conjunct of $e_i$, $\Psi^i k \in E_i$ and if $\neg \Psi^i k \in E_{i-1}$, then $\neg \Psi^i k \notin E_i$ and for all $\Psi x \in E_{i-1}$ $^{st} \neg \Psi x$ is not a conjunct of $e_i$, $\Psi x \in E_i$.

$P_n$ and $E_n$ are the precondition and the effect of the sequence.

2. A BPEL variable X is used in an action if "(refer-to X O)" is in the precondition and O (an object) appears in another precondition or an effect of the action that is not of the form "(not (refer-to X O))".
3. A BPEL variable X is assigned in an action if "(refers-to X O)" appears in an effect of that action.
4. If a BPEL variable is not used before it is assigned in a sequence of actions, then that variable is not used in the sequence.

Next, an abstraction condition is defined, allowing a sequence of BPD action types $s = \langle a_1, \ldots, a_n \rangle$ be abstracted to an ASD action type if for any instantiation of the sequence none of the above variables are used. As will be discussed in more detail below, if this condition is satisfied for all ASD actions, translation from the ASD plan to the BPD plan can be used.

Further, the preconditions and effects of the ASD action A in terms of its translation are as follows:

1. The precondition of A is the conjunction of the literals in $P_n$ excluding those of the form "(refer-to X O)". That this is indeed a precondition can be verified by considering the preconditions of the BPD actions. These preconditions are of three types. Firstly, preconditions that are part of the abstract action precondition. These are satisfied when the precondition of the abstract action is satisfied. Secondly, preconditions that are the effects of a previous action. Thirdly, preconditions of the fluent "refers-to" which are not the effect of a previous action. All variables are initialized, so the variables refer to some objects. Further, since no variable is used in the sequence, the actual object is irrelevant. Therefore, if the precondition of A holds, then the preconditions of the constituent BPD actions holds, and the BPD sequence is executable.
2. The effect of A is the conjunction of literals in $E_n$ excluding those of the form "(refer-to X O)" or "(not (refer-to X O))". It is clear that these effects will hold at the end of the execution of the BPD actions.
3. The set of parameters of A is the set of parameters of its precondition and effect.
4. The translation of A is s.

Considering an example of an abstract action "goto", "(goto ?l1 ?l2 ?mi ?a)" is the action of the agent "?a" going from location "?l1" to location "?l2" using map "?mi". This action can be expanded to the BPD plan segment:

```
(copy-exp ?l1 ?v1 ?o1)
(copy-exp ?l2 ?v2 ?o2)
(invoke-mapper ?v1 ?v2 ?v3 ?mi ?l1 ?l2 ?i1)
(copy-var ?v3 ?v4 ?mi ?o3)
(invoke-display1 ?v4 ?v5 ?mi ?l1 ?l2 ?a)
```

The above "goto" action may also be represented in the ASD as follows:

```
(:action goto
    :parameters (?l1 - location ?l2 -location
                 ?mi - map-info ?a - agent)
    :precondition (and (is-mapinfo ?l1 ?l2 ?mi)
                       (at ?a ?l1))
    :effect (and (knows ?a ?mi)
                 (not (at ?a ?l1)) (at ?a ?l2)))
```

The precondition includes the fact that some object is the map to get between the two locations. The effect of the action in addition to the agent having changed location is that he knows the map, assuming that the user travels between the locations.

A problem is defined in the ASD by filtering the BPD problem specification of variables and their initializations.

Still referring to FIG. 6, at processing block 604, processing logic generates an ASD plan based on the specification of the ASD. In one embodiment, processing logic uses a PDDL planner to obtain the ASD plan. For the example discussed above, the plan generated may be expressed as follows:

```
(GOTO HOTEL METREON MAP-HOTEL-METREON-INFO USER)
(VISIT METREON METREON-YP-INFO USER)
(GOTO METREON HOTEL MAP-METREON-HOTEL-INFO USER)
```

This ASD plan is shorter and more understandable than the plan produced by process 500 and discussed above in conjunction with FIG. 5.

At processing block 606, processing logic translates the ASD plan to a BPD plan. In one embodiment, the ASD plan is translated using the translation defined above. In addition, processing logic adds to the ASD plan the BPEL variables, information objects and their initializations in the corresponding problem description. In particular, processing logic finds the type of the variables in the action specifications in the BPD domain. If the action specifies a superclass of the variable, processing logic examines all occurrences of the variable and selects the most specific type. The identity of the variables is arbitrary since they are not used in the abstract actions and are initialized to a null object. The information objects are declared to be of the most general information type. An exemplary BPD plan translated from the ASD plan provided above can be expressed as follows:

```
(COPY-EXP HOTEL V11 ...)
(COPY-EXP METREON V12 ...)
(INVOKE-MAPPER V11 V12 V13 ...)
(COPY-VAR V13 V14 ...)
(INVOKE-DISPLAY1 V14 V15 ...)
(COPY-EXP METREON V21 ...)
(INVOKE-YP V21 V22 ...)
(COPY-VAR V22 V23 ...)
(INVOKE-DISPLAY2 V23 V24 ...)
(COPY-EXP METREON V31 ...)
(COPY-EXP HOTEL V32 ...)
(INVOKE-MAPPER V31 V32 ...)
(COPY-VAR V33 V34 ...)
(INVOKE-DISPLAY1 V34 V35 ...)
```

As compared to the plan produced by process 500 and discussed above in conjunction with FIG. 5, this BPD plan is easier to understand since the actions belonging to the abstract actions are not interleaved as in the plan produced by process 500.

In one embodiment, the translation of an ASD plan results in a correct BPD plan if the abstraction condition is satisfied by the ASD actions. This is true because of the following reasons: (1) all the arguments in the BPD actions are instantiated; (2) the preconditions of every BPD action in the translated plan are satisfied before execution; and (3) all the effects of the ASD plans are achieved in the same order in the sequence of BPD actions. Thus, the resulting BPD plan is executable and it achieves the result desired.

At processing block 608, processing logic translates the BPD plan to a BPEL process composition, as discussed in more detail above.

Accordingly, process 600 provides an abstract service domain in which BPEL variables are removed. This results in a smaller state space, more efficient search and plans that are easier to understand. In addition, the use of translation of ASD plans rather than further planning for refinement as would be performed in abstraction hierarchies or hierarchical task network (HTN) planning also improves scalability and efficiency of the Web Service composition process.

FIG. 7 is a flow diagram of an alternative embodiment of a process for composing Web Services using an abstract service domain.

Referring to FIG. 7, processing logic of process 700 begins with developing an ASD (processing block 702), as discussed in greater detail above.

At processing block 704, processing logic transforms the ASD into a BPD. In one embodiment, the transformation is done by adding the value fluents and the copy and invoke actions to the ASD and removing the abstract actions.

At processing block 706, processing logic derives a plan in the BPD, as discussed above.

At processing block 708, processing logic translates the BPD plan to a BPEL process composition. In one embodiment, the BPD plan is translated directly to the dynamic parts of the BPEL composition.

Accordingly, process 700 simplifies process 600 described above by eliminating the need for translating an ASD plan to a BPD plan. However, it requires BPEL segments to be available initially.

Once a BPEL process composition is created, it can be executed in different deployment scenarios. For example, for a device without network constraints (e.g., a device connected to a LAN network) and without memory constraints, such an execution involves deploying and running the BPEL process composition on a BPEL engine.

For a network-constrained device and a pool of services some of which are external to the device, the BPEL process composition may be 'pre-executed' on behalf of the device. The pre-execution may involve both exhaustive pre-execution (in which a tree traversal of the plan is performed, all remote Web Services executed, and their results cached), as well as most-likely-path pre-execution (in which the most likely paths of plan execution is traversed in advance, and the results of the remote Web Services cached). The plan, along with the cached results, is then downloaded onto the device.

For a memory-constrained device with a memory footprint that is too small to execute the BPEL process composition, the BPEL process composition is executed on the behalf of the device by an agent/proxy, and the result(s) are displayed by the device.

In one embodiment, run time monitoring for a composite Web Service execution is provided. As a result, debugging support is added for break points and watch points during the execution of the Web Service composition. In addition, execution tracing/monitoring is enabled by adding debugging support to monitor sequential execution of the composition for every Web Service invocation in a manner similar in function to a "−x " option for a UNIX shell script execution, or the "ctrace" utility for debugging 'C' language programs. Further, auditing support for a Web Service composition execution can be added, as well as profiling of the Web Service composition, and turning the monitoring on or off at run time (e.g., for diagnostics).

Figure 8:
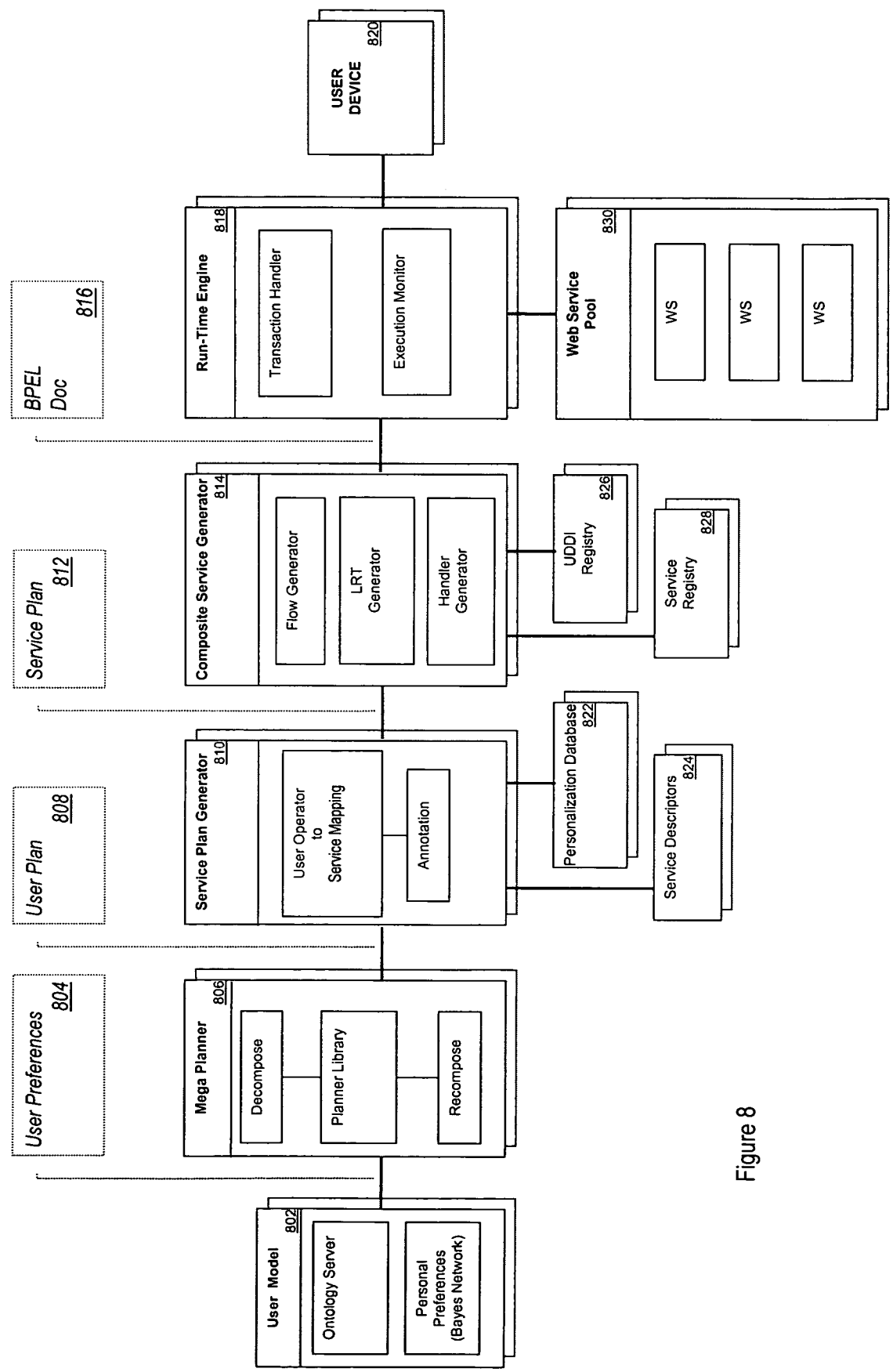
FIG. 8 is a block diagram of one embodiment of a dynamic Web Service composition system.

FIG. 8 is a block diagram of one embodiment of a dynamic Web Service composition system.

Referring to FIG. 8, based on a user model 802, user preferences 804 are provided to a planner 806 (e.g., a conditional HTN planner) which generates an ASD plan 808. A service plan generator 810 uses a personalization database 822 and service descriptors 824 to translate the ASD plan 808 to a BPD plan 812. The personalization database 822 contains the information about the preferences of the user.

A composite service generator 814 translates the BPD plan 812 to a BPEL process composition 816 using data in a UDDI registry 826 or another equivalent service-registry 828. The UDDI registry 826 is a registry of Web Services, service providers, and service type definitions. The service registry 828 is a more general concept, and includes the UDDI registry, ebXML Reg/Rep, registry of OWL-S service descriptions, as well as ad-hoc means of storing metadata about Web Services, such as databases.

The BPEL process composition is then executed in a runtime engine 818 of a client device 820, invoking relevant Web Services from a Web Service pool 830.

Figure 9:
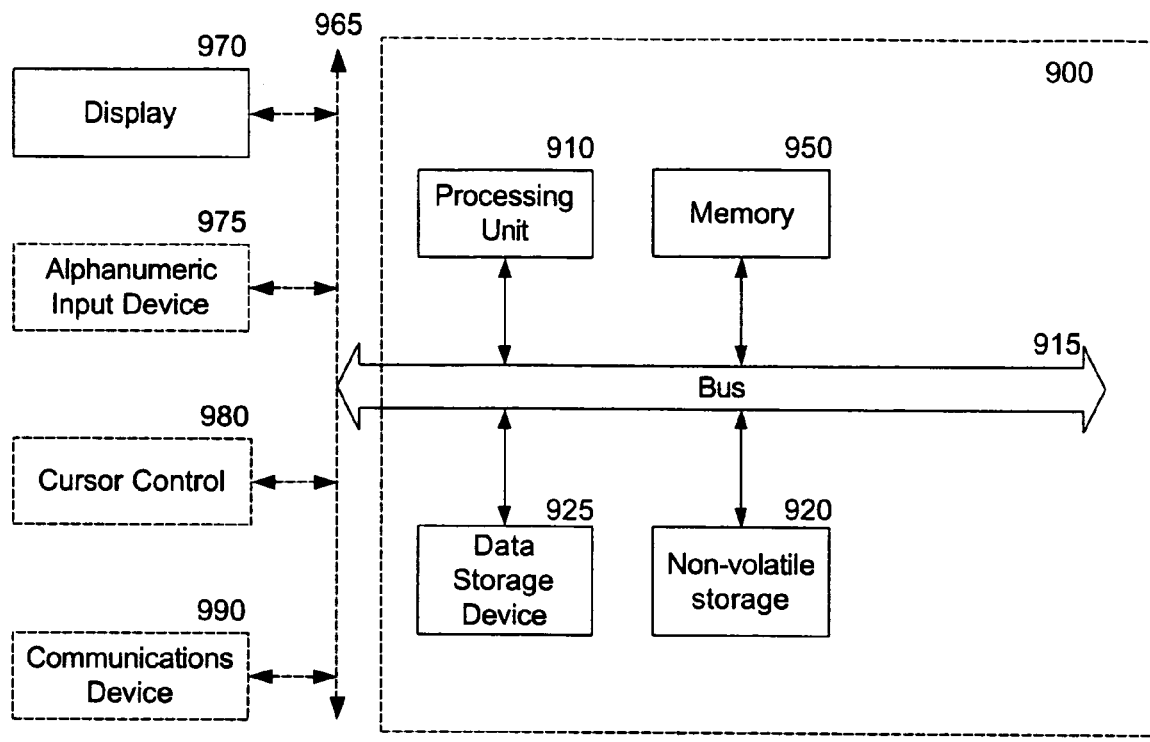
FIG. 9 is a block diagram of a computer system on which the present invention may be implemented.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, a wireless connection mechanism, or any other mechanism that provides connectivity between the computer system 900 and the outside world. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computerized method of creating a Web Service composition to enable a user to achieve a goal comprising:

receiving, by a server, a user request from a user system, wherein the user request includes the goal of the user;

identifying a plurality of Web Services needed to service the user request and one or more of a plurality of devices or one or more of a plurality of web servers that are capable of providing those services;

generating, based on the plurality of identified Web Services, a service plan expressed in a first syntax, wherein the service plan represents a plurality of invocation actions that invoke the plurality of identified Web Services and a plurality of copy actions that set references of variables associated with the plurality of identified Web Services;

translating the service plan from the first syntax into a Web Service composition expressed in a second syntax of a business process modeling language incorporating exception handling; and transmitting the Web Service composition comprising the plurality of invocation actions and the plurality of copy actions to the user system.

2. The method of claim 1 further comprising:
executing the expressed Web Service composition in a business process modeling language execution engine.

3. The method of claim 1 wherein the business process modeling language incorporating exception handling is any one of Business Process Execution Language for Web Services (BPEL4WS), Business Process Modeling Language (BPML), and Web Service Choreography Interface (WSCI).

4. The method of claim 1 further comprising:
determining constraints and preferences associated with the user request.

5. The method of claim 1 wherein the Web Service composition is generated using automated planning technique.

6. The method of claim 1 wherein translating the service plan from the first syntax into the Web Service composition expressed in the second syntax of the business process modeling language comprises:
developing a planning domain associated with the business process modeling language; and
creating a plan based on a specification of the planning domain.

7. The method of claim 1 wherein translating the service plan from the first syntax into the Web Service composition expressed in the second syntax of the business process modeling language comprises:
developing an abstract service domain (ASD);
generating a first plan based on a specification of the ASD;
translating the first plan into a second plan created based on a specification of a second domain associated with the business process modeling language; and
translating the second plan into the Web Service composition expressed in the business process modeling language.

8. The method of claim 7 wherein the ASD is developed based on input of a domain expert.

9. The method of claim 7 wherein the first plan is generated using a hierarchical task network (HTN) planner.

10. The method of claim 1 wherein translating the service plan from the first syntax into the Web Service composition expressed in the second syntax of the business process modeling language comprises:
developing an abstract service domain (ASD);
converting the ASD to a second domain associated with the business process modeling language; and
obtaining a plan based on a specification of the second domain.

11. An apparatus comprising:
a request receiver configured to receive a user request from a user, wherein the user request includes a goal of the user;
a plan generator configured to identify a plurality of Web Services needed to service the user request and one or more of a plurality of devices or one or more of a plurality of web servers that are capable of providing those services, and to generate a service plan based on the plurality of identified Web Services expressed in a first syntax wherein the service plan represents a plurality of invocation actions that invoke the plurality of Web Services and a plurality of copy actions that set references of variables associated with the plurality of Web Services;
a translator configured to translate the service plan from the first syntax into a Web Service composition expressed in a second syntax of a business process modeling language incorporating exception handling, and to transmit the Web Service composition comprising the plurality of invocation actions and the plurality of copy actions to a user system.

12. The apparatus of claim 11 wherein the business process modeling language incorporating exception handling is any one of Business Process Execution Language for Web Services (BPEL4WS), Business Process Modeling Language (BPML), and Web Service Choreography Interface (WSCI).

13. The apparatus of claim 11 wherein the request receiver is to determine constraints and preferences associated with the user request.

14. The apparatus of claim 11 wherein the Web Service composition is generated using automated planning technique.

15. The apparatus of claim 11 wherein the translator is to translate the service plan from the first syntax into the Web Service composition expressed in the second syntax of the business process modeling language by developing a planning domain associated with the business process modeling language and creating a plan based on a specification of the planning domain.

16. The apparatus of claim 11 wherein the translator is to translate the service plan from the first syntax into the Web Service composition expressed in the second syntax of the business process modeling language by developing an abstract service domain (ASD), generating a first plan based on a specification of the ASD, translating the first plan into a second plan created based on a specification of a second domain associated with the business process modeling language, and translating the second plan into the Web Service composition expressed in the business process modeling language.

17. The apparatus of claim 16 wherein the ASD is developed based on input of a domain expert.

18. The apparatus of claim 16 wherein the first plan is generated using a hierarchical task network (HTN) planner.

19. The apparatus of claim 11 wherein the translator is to translate the service plan from the first syntax into the Web Service composition expressed in the second syntax of the business process modeling language by developing an abstract service domain (ASD), converting the ASD to a second domain associated with the business process modeling language, and obtaining a plan based on a specification of the second domain.

20. An apparatus comprising:
means for receiving a user request from a user, wherein the user request includes the goal of the user;

means for identifying a plurality of Web Services needed to service the user request and one or more of a plurality of devices or one or more of a plurality of web servers that are capable of providing those services;

means for generating based on the plurality of identified Web Services, a service plan expressed in a first syntax wherein the service plan represents a plurality of invocation actions that invoke the plurality of Web Services and a plurality of copy actions that set references of variables associated with the plurality of Web Services;

means for translating the service plan from the first syntax into a Web Service composition expressed in a second syntax of a business process modeling language incorporating exception handling; and means for transmitting the Web Service composition comprising the plurality of invocation actions and the plurality of copy actions to a user system.

21. The apparatus of claim 20 wherein the business process modeling language incorporating exception handling is any one of Business Process Execution Language for Web Services (BPEL4WS) and a Business Process Modeling Language (BPML), and Web Service Choreography Interface (WSCI).

22. A non-transitory, machine readable medium having stored thereon data representing sequences of instructions, which when executed by a computer system, cause said computer system to perform a method comprising:

receiving a user request from a user, wherein the user request includes the goal of the user;

identifying a plurality of Web Services needed to service the user request and one or more of a plurality of devices or one or more of a plurality of web servers that are capable of providing those services;

generating, based on the plurality of identified Web Services, a service plan expressed in a first syntax, wherein the service plan represents a plurality of invocation actions that invoke the plurality of identified Web Services and a plurality of copy actions that set references of variables associated with the plurality of identified Web Services;

translating the service plan from the first syntax into a Web Service composition expressed in a second syntax of a business process modeling language incorporating exception handling; and transmitting the Web Service composition comprising the plurality of invocation actions and the plurality of copy actions to a user system.

23. The non-transitory, machine-readable medium of claim 22 wherein the business process modeling language incorporating exception handling is any one of Business Process Execution Language for Web Services (BPEL4WS), Business Process Modeling Language (BPML), and Web Service Choreography Interface (WSCI).

24. A system comprising:

a memory; and at least one processor coupled to the memory, the at least one processor executing a set of instructions which cause the at least one processor to:

receive a user request from a user, wherein the user request includes the goal of the user, identify a plurality of Web Services needed to service the user request and one or more of a plurality of devices or one or more of a plurality of web servers that are capable of providing those services;

generate, based on the plurality of identified Web Services, a service plan expressed in a first syntax, wherein the service plan represents a plurality of invocation actions that invoke the plurality of identified Web Services and a plurality of copy actions that set references of variables associated with the plurality of identified Web Services;

translate the service plan from the first syntax into a Web Service composition expressed in a second syntax of a business process modeling language incorporating exception handling; and transmit the Web Service composition comprising the plurality of invocation actions and the plurality of copy actions to a user system.

25. The system of claim 24 wherein the business process modeling language incorporating exception handling is any one of Business Process Execution Language for Web Services (BPEL4WS) and Business Process Modeling Language (BPML), and Web Service Choreography Interface (WSCI).

* * * * *